United States Patent [19]
Ciochetti

[11] Patent Number: 5,682,624
[45] Date of Patent: Nov. 4, 1997

[54] VACUUM RELIEF SAFETY VALVE FOR A SWIMMING POOL FILTER PUMP SYSTEM

[76] Inventor: Michael James Ciochetti, 1364 W. 62nd St., Hialeah, Fla. 33012

[21] Appl. No.: 483,531

[22] Filed: Jun. 7, 1995

[51] Int. Cl.⁶ .................................................. E04H 4/12
[52] U.S. Cl. ...................... 4/509; 4/541.2; 137/526; 137/907; 251/51
[58] Field of Search ................. 4/504, 509, 541.1, 4/541.2; 137/524, 526, 493.1, 505.11, 907; 251/57

[56] References Cited

U.S. PATENT DOCUMENTS

| | | | |
|---|---|---|---|
| 398,445 | 2/1889 | Pratt | 137/524 |
| 480,528 | 8/1892 | Thoms | 137/524 |
| 2,357,318 | 9/1944 | Donaldson | 50/23 |
| 2,431,457 | 11/1947 | Bondurant | 137/526 |
| 2,505,376 | 4/1950 | Asselin | 137/526 |
| 2,546,678 | 3/1951 | Rockwell | 137/526 |
| 2,557,536 | 6/1951 | Drane et al. | 137/53 |
| 2,642,888 | 6/1953 | Danel | 137/526 |
| 3,145,724 | 8/1964 | Pelzer | 136/524 |
| 4,155,878 | 5/1979 | Johnson et al. | 4/509 |
| 4,596,656 | 6/1986 | Higginbotham et al. | 210/169 |
| 4,624,277 | 11/1986 | Veite | 137/505.11 |
| 4,867,802 | 9/1989 | Earl | 137/526 |
| 5,105,848 | 4/1992 | Kallenbach | 137/493.1 |
| 5,167,041 | 12/1992 | Burkitt, III | 4/541.2 |
| 5,236,581 | 8/1993 | Perry | 4/541.3 |
| 5,347,664 | 9/1994 | Hamza et al. | 4/509 |
| 5,363,877 | 11/1994 | Frentzel et al. | 137/526 |
| 5,499,406 | 3/1996 | Chalberg et al. | 4/541.2 |

*Primary Examiner*—Henry J. Recla
*Assistant Examiner*—Charles R. Eloslway
*Attorney, Agent, or Firm*—Gary M. Hartman; Domenica N. S. Hartman

[57] ABSTRACT

A method and device are provided for preventing a child or an object from being trapped by suction to a drain of a swimming pool filter pump system. The invention entails a safety valve capable of causing the filter pump to immediately lose its prime when a child or object becomes trapped against the drain of a swimming pool, so that the vacuum created by the filter pump is completely eliminated. The valve of this invention can be mounted directly to a suction line fluidically interconnecting the drain and the filter pump, and is constructed to permit air to rapidly flow into the suction line if a predetermined vacuum level is exceeded within the suction line, as is the case if the drain becomes partially or completely obstructed. The influx of air causes the filter pump to rapidly lose its prime, thereby completely eliminating the vacuum and the resulting hazardous condition.

14 Claims, 3 Drawing Sheets

VACUUM RELIEF SAFETY VALVE FOR A SWIMMING POOL FILTER PUMP SYSTEM

BACKGROUND OF THE INVENTION

1. Field of the Invention

The present invention generally relates to relief valves. More particularly, this invention relates to a vacuum relief safety valve adapted for use on a suction line of a swimming pool filter pump system, and particularly large pumping systems used in commercial pools. The safety valve causes the filter pump to lose its prime if a predetermined vacuum level is reached in the pump system, such as when an object obstructs the pool's main drain. Consequently, the safety valve serves as a safety device to eliminate pump suction if a child becomes trapped by the suction of the filter pump.

2. Description of the Prior Art

To maximize enjoyment and maintain proper sanitary conditions, swimming pools must be constantly cleaned of debris, dirt and other contaminants. Such a requirement is particularly demanding in the case of large commercial pools that are used by a large number of people. For most pools, the primary task of cleaning is performed by a filter pump system that continuously draws water through a drain located at the bottom of the pool, typically at or near its deepest point, and through a number of suction lines located elsewhere, typically along the perimeter of the pool. As with all pools, but particularly commercial pools, a high rate of water flow must be achieved through a suitable tikering medium in order to maintain an acceptable level of cleanliness. Consequently, a high capacity pump must be employed to draw the water from the pool, with a relatively larger pump generally being required as the size of the pool increases.

A significant hazard with the use of such large filter pumps is the potential for children to become drawn and trapped against the drain or a suction line as a result of the vacuum created by the pump when the drain or suction line inlet is obstructed. Occurrences of this type of accident have caused the pool industry to look for solutions that prevent a child from becoming drawn to and trapped at the drain, primarily by modifying the drain's construction. Examples of this approach include U.S. Pat. No. 4,658,449 to Martin, which is directed to a protective adapter for covering a pool drain, and U.S. Pat. No. 3,940,807 to Baker et al., which is directed to modifying the drain opening itself in order to more uniformly distribute the flow of water toward the center of the drain. While such approaches may be acceptable for many pool applications, a solution that is capable of being retrofitted to an existing pool without altering the appearance, size or construction of the drain is often more desirable and practical. Furthermore, these solutions only reduce the suction level at the drain. Safer operation of the pool could be achieved if the dangerous suction condition at the pool drain were completely eliminated immediately upon the drain being obstructed by a child.

SUMMARY OF THE INVENTION

It is an object of this invention to provide a method for preventing a child or object from being trapped by suction to a drain or suction line of a swimming pool filter pump system.

It is a further object of this invention that such a method entail causing the filter pump to immediately lose its prime when an object obstructs the drain or a suction line of a swimming pool, so that the vacuum created by the filter pump is completely eliminated.

It is another object of this invention that the filter pump system respond more quickly as the capacity of the pump system increases, such that the level of safety provided is commensurate with the potential hazard posed by the capacity of the pump operating the system.

It is yet another object of this invention that the above objects be accomplished by equipping the filter pump system with a valve immediately upstream of the filter pump, in which the valve is adapted to cause the filter pump to rapidly lose its prime if the drain becomes obstructed.

In accordance with a preferred embodiment of this invention, these and other objects and advantages are accomplished as follows.

According to the present invention, there is provided a method and device for preventing a child or an object from being trapped by suction to a drain or any other suction line of a swimming pool filter pump system. In particular, the invention entails a device capable of causing the filter pump to immediately lose its prime when a child or object obstructs or becomes trapped against the drain or suction line inlet of a swimming pool, so that the vacuum created by the filter pump is completely eliminated. The device of this invention is constructed as a vacuum relief valve that can be mounted directly to a suction line fluidically interconnecting the pool's main drain and suction lines with the pool's filter pump. The relief valve is constructed to permit air to rapidly flow into the drain and suction lines if a predetermined vacuum level is exceeded within the lines, as is the case if the drain or one of the pool's suction line inlets becomes partially or completely obstructed. The rapid influx of air eliminates the vacuum within the lines and, therefore, the resulting unsafe condition. The response of the valve is preferably damped such that the valve will remain open sufficiently long to cause the filter pump to completely lose its prime.

An advantageous aspect of this invention is that an existing pool can be readily retrofitted with the safety valve of this invention. In particular, the invention does not necessitate that the drain be modified or reconstructed, such that the benefits of the invention can be realized without draining the pool and performing extensive and potentially expensive structural work on the pool. Instead, the invention can be implemented by installing the safety valve in the main suction line outside of the pool and immediately upstream of the filter pump.

Another significant advantage of this invention is that the method of this invention does not seek to reduce or alter the flow characteristics at the drain in order to reduce the hazard level posed by a high capacity filter pump system, but instead serves to completely eliminate the hazard if the appropriate circumstances arise. Because the drain design does not detract or contribute significantly to the operation of the invention, the drain can be optimally designed to perform its intended function of efficiently removing water and debris from the floor of a pool.

Finally, another advantage of the invention is that the speed with which the safety valve responds to an obstruction actually increases with the use of larger capacity filter pump systems. As a result, the level of safety provided by the invention is always commensurate with the potential hazard posed by the capacity of the pump operating the system.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 3:
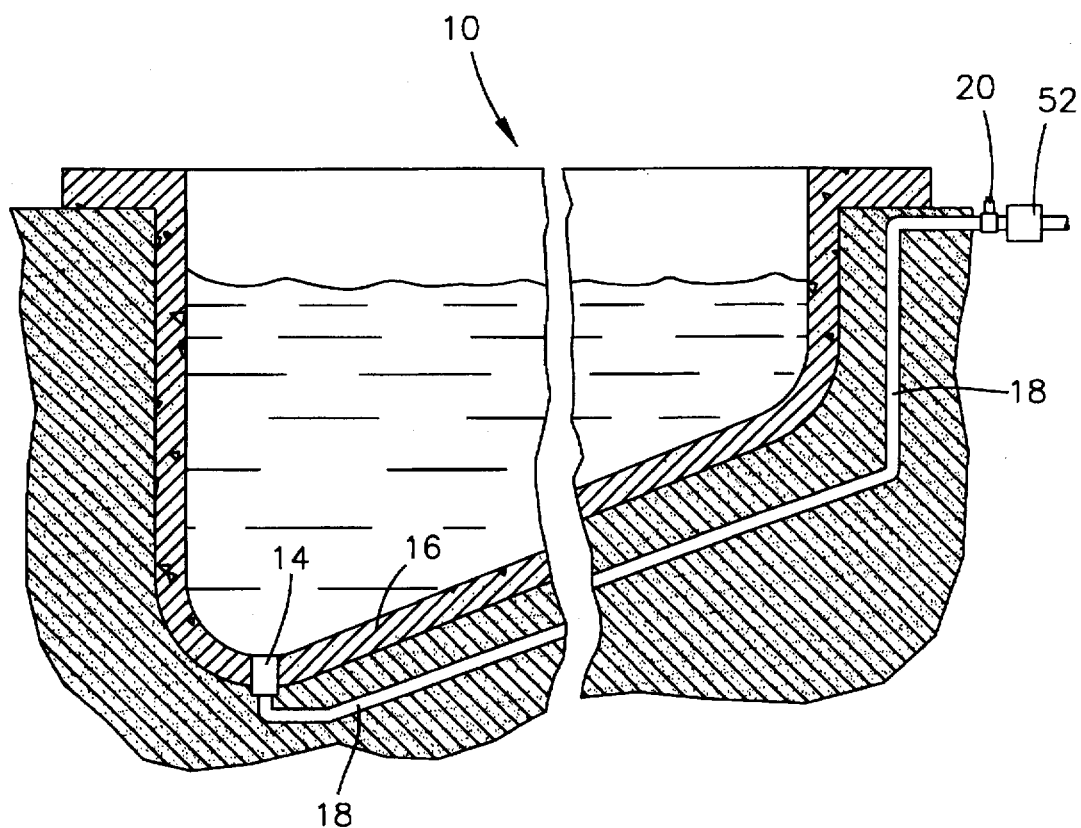
FIG. 3 illustrates the installation of the safety valve of FIG. 1 in the main drain line of a swimming pool, in accordance with the preferred embodiment of this invention.

The invention illustrated in the Figures provides a method and device for preventing a child or an object from being trapped by suction to a drain or suction line inlet of a swimming pool filter pump system. Shown in FIG. 3 is a representation of a swimming pool 10 that is conventionally equipped with a filter pump 12 that draws water from the pool 10 and through a filtration system (not shown). The particular design of the filtration system is not critical to the design and operation of the invention, and therefore will not be discussed in detail. As illustrated, the pool 10 is equipped with a main drain 14 located in the pool floor 16 at its deepest point, though it is foreseeable that the pool 10 could be equipped with multiple drains and suction line inlets at various locations in the pool 10. The drain 14 illustrated in FIG. 3 is referred to as the pool's main drain to the extent that the majority of the water pumped from the pool 10 is drawn through the drain 14. As is conventional, a suction line 18 is provided that fluidically interconnects the drain 14 and the pump 12.

Figure 1:
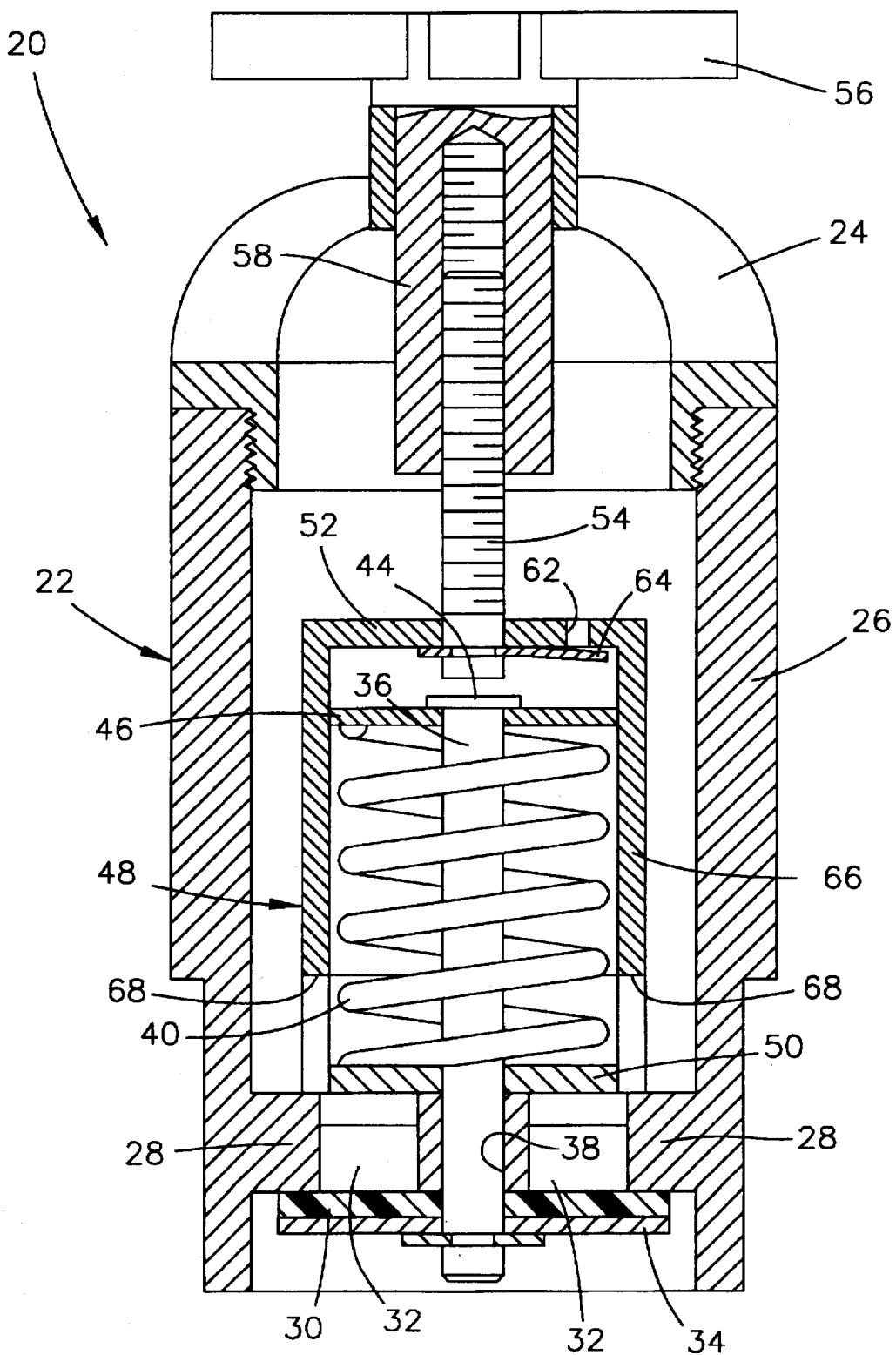
FIG. 1 shows in cross-section a vacuum relief safety valve in accordance with a preferred embodiment of this invention.
Figure 2:
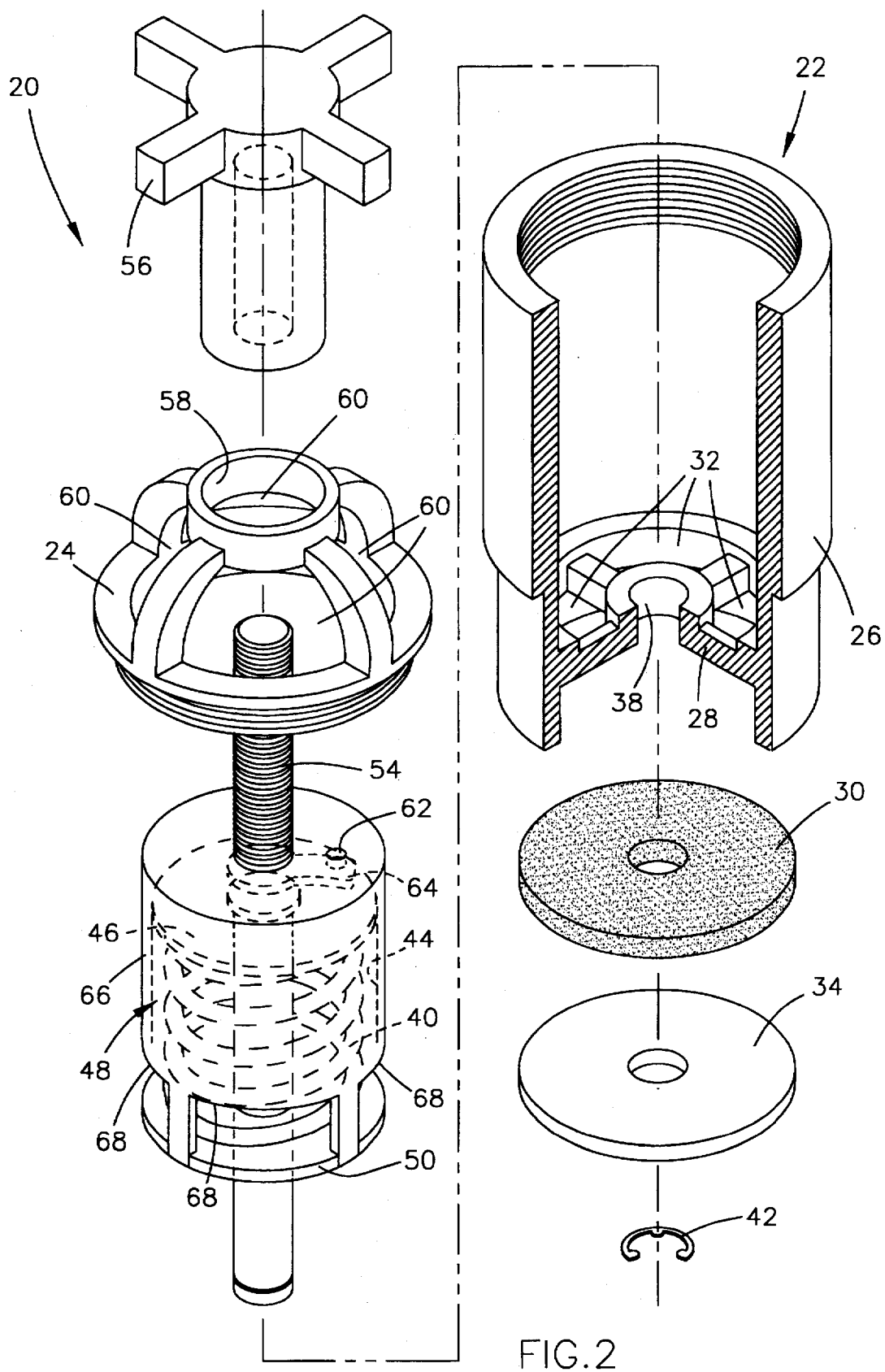
FIG. 2 shows an exploded view of the safety valve of FIG. 1.

In accordance with this invention, the pool 10 is further equipped with a vacuum relief safety valve 20 as represented in FIG. 3, and shown in greater detail in FIGS. 1 and 2. The safety valve 20 is adapted to vent the suction line 18 to atmosphere in the event that the drain 14 becomes obstructed, such that the prime of the pump 12 is immediately and completely lost. As a result, the vacuum that would otherwise trap the obstruction against the drain 14 is immediately released, allowing the obstruction to be easily freed. In the situation where a child obstructs the drain 14, the child can then either swim to safety or be easily assisted by others.

FIGS. 1 and 2 illustrate a suitable construction for the safety valve 20, but not the only construction and design for the valve 20 in terms of performing the desired function. However, the valve 20 as illustrated embodies several design features that make the valve 20 particularly suited for its intended use. As shown, the valve 20 is generally constructed to include a two-piece housing 22 composed of a dome 24 vented by openings 60 and mounted to a casing 26. The dome 24 is shown as being threaded onto the casing 26, though other assembly methods could be employed. The casing 26 has a generally tubular shape, with the end of the casing 26 opposite the dome 24 being formed with a valve seat 28. The end of the casing 26 adjacent the seat 28 is adapted to be mounted to the suction line 18. A diaphragm 30 abuts against the lower surface of the seat 28, such that vents 32 formed in the seat 28 are closed by the diaphragm 30. The diaphragm 30 is preferably formed from an elastomeric material, such as a silicone rubber, such that an air-tight seal is achieved with the seat 28. The diaphragm 30 is mounted with a backup ring 34 on a shaft 36 that reciprocably extends through a central bore 38 formed in an annular-shaped portion of the seat 28. The lower end of the shaft 36 is equipped with a C-clip 42 that retains the diaphragm 30 and backup ring 34, while the upper end of the shaft 36 is formed to have a shoulder 44 that retains a washer 46 and spring 40 on the shaft 36. The spring 40 is mounted on the shaft 36 and compressed by the washer 46 in order to bias the diaphragm 30 firmly against the surface of the seat 28, such that the vents 32 are normally closed in an air-tight manner.

According to the above construction, the vents 32 do not permit the passage of air through the valve 20 unless a counteracting force acts on the spring 40, such as a vacuum on the backside of the diaphragm 30 opposite the seat 28. In use, the valve 20 is mounted to the suction line 18, with its end nearest the seat 28 being in fluidic communication with the suction line 18. As such, the biasing force generated by the spring 40 is overcome if the suction line 18 is subject to a sufficiently high vacuum, such as when the drain 12 is blocked while the pump 12 continues to operate.

The vacuum level at which the diaphragm 30 is pulled away from its seat 28 is dependent on the biasing force generated by the spring 40. In a preferred embodiment, this biasing force can be adjusted in order to permit the valve 20 to be used under varying conditions influenced by the valve's proximity to the pump 12, the head pressure resulting from the vertical distance between the valve 20 and drain 12, and losses resulting from the number of fittings and bends in the suction line 18. As illustrated, an uncomplicated device for adjusting the spring's biasing force is to enclose the spring 40 in a cage 48, such that the end of the spring 40 nearest the diaphragm 30 is biased against one end 50 of the cage 48, while clearance is provided between the shaft 36 and spring 40 and an oppositely-disposed closed end 52 of the cage 48. The cage 48 is then rotatably attached to one end of a threaded shaft 54 that is threaded into a handle 56, which in turn is rotatably supported by a central bushing 58 formed in the dome 24. As such, rotation of the handle 56 causes the threaded shaft 54 to thread into or out of the handle 56, thereby causing the cage 48 to move toward or away from the seat 28. If the cage 48 is displaced away from the seat 28, the spring 40 is further compressed between the end 50 of the cage 48 and the washer 46, thereby increasing the biasing force such that a greater vacuum is required on the diaphragm 30 in order to lift the diaphragm 30 off of the seat 28. In contrast, moving the cage 48 toward the seat 28 reduces spring compression, such that the biasing force generated by the spring 40 is reduced, enabling a lesser vacuum to pull the diaphragm 30 off of the seat 28.

The closed end 52 of the cage is equipped with a check valve, shown here as being formed by an orifice 62 and flapper 64, though other types of one-way valves could foreseeably be used. The check valve operates in conjunction with the washer 46, which is sized to provide a minimal diametrical clearance between its perimeter and the interior walls of the cage 48. An optimal clearance can be readily determined experimentally for the purpose of sufficiently damping the operation of the valve 20 by reducing the speed at which the diaphragm 30 is permitted to return to its seat 28. Specifically, as the diaphragm 30 is pulled off its seat 28 by a high vacuum condition within the suction line 18, air is freely drawn into the suction line 18 through the open lower end of the cage 48 and the vents 32 in the seat 28. Simultaneously, air is also freely drawn into the chamber formed by the washer 46 and cage 48 through the orifice 62, such the movement of the washer 46 within the cage 48 is unimpeded. In contrast, the return of the diaphragm 30 to its closed position is retarded because the flapper 64 obstructs the orifice 62, necessitating that the air within the chamber be forced out between the washer 46 and the walls of the cage 48 before that diaphragm 30 can again be seated on the seat 28. In this manner, the diaphragm 28 is not permitted to reseat itself too quickly in response to a rapid drop in vacuum within the suction line 18 as air rushes into the suction line 18. As a result, rapid cycling of the valve 20 is prevented and a complete loss in prime can be achieved at the pump 52 if a sufficient obstruction occurs at the drain 14.

Use and operation of the safety valve 20 of this invention can be summarized as follows. Through experimentation or calibration, the valve 20 is adjusted with the handle 56 to enable the diaphragm 30 to lift of the seat 28 in response to a maximum allowable vacuum level. This vacuum level can be established experimentally or predicted based on the size of the drain 14 and the capacity of the pump 12. The valve 20 can then be installed on the suction line 18 in a convenient or accessible location, such as near the pump 12. If the casing 26 is formed from polyvinyl chloride (PVC) or another suitable plastic, the end of the valve 20 nearest the seat 28 can be glued into an opening formed in the suction line 18. Alternatively, the end of the casing 26 can be threaded, such that the valve 20 can be threaded into an appropriate fitting mounted in the suction line 18. This approach is particularly practical if the casing 26 is made from metal, such as steel or brass.

Once installed, the suction line 18 remains unvented by the diaphragm 30, enabling the swimming pool 10 and its filtration system to operate completely as designed and intended, until such time that the drain 14 becomes sufficiently obstructed to cause the vacuum level within the suction line 18 to exceed the maximum allowed level established by the valve 20. Once this pre-established level is exceeded, the valve 20 immediately permits air to be drawn into the suction line 18 through the openings 60 in the dome 24, the lower open end of the cage 48, and the vents 32 in the seat 28. The vacuum level within the line 18 will begin to drop as air enters the suction line 18, such that the diaphragm 30 may be permitted to slowly return to its seat 28 at a rate dictated by the escape of air within the cage 48 past the washer 48. If the obstruction is sufficiently brief, it is foreseeable that the pump 52 could regain its prime and continue to pump normally. However, as is the case where a child has become trapped at the drain 14, the diaphragm 30 will be sufficiently deterred from being reseated, such that a complete loss in prime at the pump 52 will occur. The resulting complete loss of vacuum within the suction line 18 enables the child to free himself or herself from the drain 14, or with the assistance of others.

Notably, the response time for the valve 20 is dependent on the rapidity with which the vacuum level increases within the suction line 18. Because higher capacity pumps of the type used in large commercial pools are capable of generating a vacuum more rapidly than lower capacity pumps, the response time for the valve 20 will be proportionately shorter for pools equipped with larger pumps. Advantageously, the valve 20 of this invention is therefore more responsive under conditions in which the greatest hazard is posed to children.

In view of the above, it can be seen that a significant advantage of this invention is that an existing pool can be readily retrofitted with the safety valve 20 of this invention by simply mounting the valve 20 to the pool's existing suction line. Consequently, this invention does not necessitate that the pool's drain be modified or reconstructed, such that the benefits of the invention can be realized without draining the pool and performing extensive and expensive structural work on the pool. Instead, the invention can be implemented by installing the safety valve 20 in a suction line outside of the pool, such as near the filter pump. Accordingly, a related advantage of this invention is that the flow characteristics at the pool drain are not reduced or altered in order to reduce the hazard level posed by a high capacity filter pump system. Instead, this invention serves to completely eliminate the hazard by venting the suction line to atmosphere if appropriate circumstances arise. Because the drain design does not detract or contribute significantly to the operation of the invention, the drain can be optimally designed to perform its intended function of efficiently removing water and debris from the pool. Finally, another advantage of the invention is that the speed with which the safety valve 20 responds to an obstruction actually increases for large capacity filter pump systems. As a result, the level of safety provided by the invention is always commensurate with the potential hazard posed by the capacity of the pump operating the system.

While our invention has been described in terms of a preferred embodiment, it is apparent that other forms could be adopted by one skilled in the art. For example, the particular construction of the valve 20 could be significantly altered or modified without changing its intended function, the manner in which the valve 20 is mounted in a filtration system and its location within the filtration system could be other than that shown, the type of suction line in which the valve 20 is employed could be other than a pool filtration system, and materials other than those mentioned could be employed to construct the valve 20. Accordingly, the scope of the invention is to be limited only by the following claims.

The embodiments of the invention in which an exclusive property or privilege is claimed are defined as follows:

1. A swimming pool equipped with a pump for drawing water from the pool and through a filter system, the swimming pool comprising:

an inlet disposed in the swimming pool;

a suction line in fluidic communication with the inlet and the pump such that the pump operates to draw water from the swimming pool through the inlet;

a vacuum relief safety valve mounted to the suction line, the vacuum relief safety valve being adapted to sense and respond to a vacuum level within the suction line so as to open and thereby deliver air to the suction line if a maximum allowed vacuum level within the suction line is exceeded; and means for damping closing of the vacuum relief safety valve so as to promote the delivery of air to the suction line as the vacuum level within the suction line begins to drop.

2. A swimming pool as recited in claim 1 wherein the vacuum relief safety valve comprises means for enabling adjustment of the maximum allowed vacuum level at which air is delivered to the suction line.

3. A swimming pool as recited in claim 1 wherein the suction line is not vented to atmosphere unless the maximum allowed vacuum level is exceeded, and wherein the damping means is adapted to cause the vacuum relief safety valve to deliver air to the suction line until the pump completely loses its prime.

4. A swimming pool as recited in claim 1 wherein the vacuum relief safety valve comprises:

a housing adapted to be mounted to the suction line, the housing having a portion adapted for mounting to the suction line;

a vent disposed in the housing, the vent being adapted for fluidic communication with the suction line;

sealing means for closing the vent when the sealing means is disposed in a first position and opening the vent when the sealing means is disposed in a second position, such that a vacuum within the suction line is relieved when the sealing means is in the second position; and means for biasing the sealing means toward the first position such that the vent is normally closed, the biasing means enabling the sealing means to move toward the second position when the maximum allowed vacuum level is exceeded;

wherein the damping means delays movement of the sealing means when traveling from the second position to the first position.

5. A swimming pool as recited in claim 4 further comprising means for regulating the biasing means so as to enable adjustment of the maximum allowed vacuum level at which the sealing means initially moves toward the second position.

6. A swimming pool as recited in claim 5 wherein the regulating means comprises a retainer that houses the biasing means, the retainer being displaceable toward and away from the sealing means so as to enable adjustment of a biasing force generated by the biasing means.

7. A swimming pool as recited in claim 4 wherein the vent is disposed in the portion of the housing adapted for mounting to the suction line.

8. A swimming pool as recited in claim 4 wherein the damping means comprises:

a piston disposed in the retainer and movable with the sealing means; and a one-way valve mounted on the retainer so as to be operably associated with the piston.

9. A swimming pool as recited in claim 8 wherein the one-way valve is adapted to open in response to the sealing means moving toward the second position and to close in response to the sealing means moving toward the first position.

10. A swimming pool as recited in claim 4 wherein the inlet is the main drain for the swimming pool and the suction line is the main drain line for the swimming pool.

11. A method for preventing an obstruction from being trapped by suction to an inlet of a swimming pool filter pump system, the method comprising the steps of:

providing a suction line between the inlet and the swimming pool filter pump system;

generating a vacuum within the suction line with the swimming pool filter pump system so as to draw water through the inlet;

sensing the vacuum within the suction line;

delivering air to the suction line by opening a venting means if the vacuum within the suction line exceeds a maximum allowed vacuum level; and then damping closing of the venting means so as to promote the delivery of air to the suction line as the vacuum within the suction line begins to drop.

12. A method as recited in claim 11 further comprising the step of adjusting the maximum allowed vacuum level at which vacuum is relieved in the suction line.

13. A method as recited in claim 11 wherein the generating step is accomplished by the suction line being unvented until the maximum allowed vacuum level is exceeded, at which time air is drawn into the suction line, and wherein the damping step causes the venting means to deliver air to the suction line until the swimming pool filter pump system completely loses its prime.

14. A method as recited in claim 11 wherein the relieving step is accomplished with a vacuum relief safety valve comprising:

a housing adapted to be mounted to the suction line of the swimming pool filter pump system, the housing having a portion adapted for mounting to the suction line;

a vent disposed in the housing, the vent being adapted for fluidic communication with the suction line;

sealing means for closing the vent when the sealing means is disposed in a first position and opening the vent when the sealing means is disposed in a second position, such that a vacuum within the suction line is relieved when the sealing means is in the second position;

means for biasing the sealing means toward the first position such that the vent is normally closed, the biasing means enabling the sealing means to move toward the second position when the maximum allowed vacuum level within the suction line is exceeded; and means for damping movement of the sealing means when traveling from the second position to the first position.

* * * * *